(12) United States Patent
Jin et al.

(10) Patent No.: US 9,815,104 B2
(45) Date of Patent: Nov. 14, 2017

(54) UNCOILING, BLANKING AND FORMING METHOD

(71) Applicant: BAOSHAN IRON & STEEL CO., LTD., Shanghai (CN)

(72) Inventors: Chengguo Jin, Shanghai (CN); Saidan Yang, Shanghai (CN); Guoqiang Dai, Shanghai (CN); Junliang Qiao, Shanghai (CN); Shengbo Pan, Shanghai (CN); Ruimin Wu, Shanghai (CN); Qian Xiang, Shanghai (CN)

(73) Assignee: Baoshan Iron & Steel Co., Ltd, Shanghai (CN)

( * ) Notice: Subject to any disclaimer, the term of this patent is extended or adjusted under 35 U.S.C. 154(b) by 253 days.

(21) Appl. No.: 14/759,467

(22) PCT Filed: Apr. 28, 2014

(86) PCT No.: PCT/CN2014/076357
§ 371 (c)(1),
(2) Date: Jul. 7, 2015

(87) PCT Pub. No.: WO2014/177036
PCT Pub. Date: Nov. 6, 2014

(65) Prior Publication Data
US 2016/0030995 A1 Feb. 4, 2016

(30) Foreign Application Priority Data

Apr. 28, 2013 (CN) .......................... 2013 1 0157672

(51) Int. Cl.
*B21D 35/00* (2006.01)
*B21D 28/02* (2006.01)
(Continued)

(52) U.S. Cl.
CPC ............ *B21D 35/002* (2013.01); *B21D 28/02* (2013.01); *B21D 35/001* (2013.01); *B21D 43/18* (2013.01);
(Continued)

(58) Field of Classification Search
CPC ....... B21D 35/002; B21D 22/02; B21D 28/02; B21D 43/18; B21D 35/001; B21D 43/12;
(Continued)

(56) References Cited

U.S. PATENT DOCUMENTS 4,655,067 A 4/1987 Frost et al.

FOREIGN PATENT DOCUMENTS

CN 1652895 A 8/2005
CN 102452001 A 5/2012
(Continued)

OTHER PUBLICATIONS

PCT International Search Report, PCT/CN2014/076357, Jul. 16, 2014, 4 pages.

*Primary Examiner* — A. Dexter Tugbang
*Assistant Examiner* — John S Lowe
(74) *Attorney, Agent, or Firm* — Quarles & Brady LLP

(57) ABSTRACT

An uncoiling, blanking and forming method includes the steps of: 1) uncoiling a steel coil, wherein a steel strip uncoiled from the steel coil is cleaned and straightened and is fed by a pinch roller to a blanking region; 2) laser blanking, wherein the steel coil enters the blanking region, is cut by a laser cutting head by way of laser blanking to form sheets with a required shape, with waste materials falling down and being conveyed to the outside; 3) outputting the sheets, wherein the sheets pass over a magnetic telescopic belt conveyor, and then carried by means of a manipulator or a robot to a stamping process; 4) stamping forming, wherein the sheets are stamped to form work- (Continued)

pieces; and 5) checking, wherein the workpieces are checked and put in storage. The present invention can achieve joining-up in series of a blanking line and a stamping forming line and realize matching therebetween, and can reduce intermediate steps such as stacking, packing, transportation, positioning, unpacking, carrying, and centring of sheets and stamping-formed workpieces, and also can reduce the room required for transfer, simplify the work flow and joins up procedures in series, to directly machine a material coil by laser blanking to form formed parts.

11 Claims, 2 Drawing Sheets

(51) Int. Cl.
*B23K 26/38* (2014.01)
*B21D 43/12* (2006.01)
*B21D 43/18* (2006.01)
*B21D 22/02* (2006.01)
*B23K 26/08* (2014.01)

(52) U.S. Cl.
CPC .............. *B23K 26/38* (2013.01); *B21D 22/02* (2013.01); *B21D 43/12* (2013.01); *B23K 26/08* (2013.01)

(58) Field of Classification Search
CPC ........................... B23K 26/38; B23K 26/0846; B23K 26/0876; B23K 2201/16; B23K 26/0093; B23K 26/16
See application file for complete search history.

(56) References Cited

FOREIGN PATENT DOCUMENTS

| | | |
|---|---|---|
| CN | 202239211 U | 5/2012 |
| CN | 102615334 A | 8/2012 |
| CN | 103624487 A | 3/2014 |
| JP | 4290656 B2 | 7/2009 |
| JP | 2012086270 A | 5/2012 |

UNCOILING, BLANKING AND FORMING METHOD

CROSS-REFERENCE TO RELATED APPLICATIONS

This application represents the national stage entry of PCT International Application No. PCT/CN2014/076357 filed Apr. 28, 2014, which claims priority of Chinese Patent Application No. 201310157672.9 filed Apr. 28, 2013, the disclosures of which are incorporated by reference here in their entirety for all purposes.

FIELD OF THE INVENTION

The present invention relates to automobile plate coil machining, and more specifically, to an uncoiling, blanking and forming method for machining an automobile plate coil to form a three-dimensional stamped plate.

BACKGROUND

A traditional automobile plate die uncoiling and blanking line has a production rate of about 25 sheets per minute, and an annual output of 4,000,000-6,000,000 sheets, and after planar blank sheets are obtained by die blanking, they should be subjected to a stamping forming line to obtain stamped automobile plate parts. Three-dimensional parts are obtained by stamping forming lines corresponding to different investments and production scales. However, a robot stamping production line commonly used in China has a production rate of about 5 sheets per minute, a single-arm cross-bar manipulator stamping line has a production rate of about 10 sheets per minute, and a manual-feeding stamping line has a slower production rate of only 3-5 sheets per minute. This means that one uncoiling and blanking line should respond to multiple stamping forming production lines. This mode is commonly applied in a machining centre or an entire car plant, causing a large plant area and large investment.

In the production of small-size pop can cover stamped parts, Chinese patent application No. CN200920171407.5, for example, summarizes the existing production solutions for pop and proposes multi-passage automatic stamping methods, of which the two-punching machine synchronous operation solution or multi-passage stamping solution is suitable for production of small parts, and will undoubtedly cause a high investment pressure and a great difficulty in design and implementation.

A traditional uncoiling and blanking line requires a stacking process after blanking, bundles of sheets after stacking shall be transferred to multiple stamping lines for individual operations, each stamping line should be equipped with transferring devices for frequent transfer, such as a forklift truck, a towing flat-bed trailer or a transport truck, and processes such as unstacking, and material picking-up and loading should exist before the stamping line; and a stamping line is generally composed of multiple multiple presses or a multi-die press is used, to obtain finished parts. In short, two production lines are required to implement the forming process, respectively an uncoiling and blanking line and a stamping forming line; the need of moving the sheets repeatedly reduces the operating efficiency and requires a larger space for storage and conveyance to finally obtain shaped parts.

In order to solve the problem of huge die expenses and costs in maintenance and storage thereof resulting from die blanking and to achieve flexible blanking, laser blanking has become an applicable method. However, it is still a technical bottleneck to make the laser blanking reach the production rate of the traditional die blanking, and even if multiple cutting heads are provided to implement equivalent output to the die blanking, there still exist a number of technical difficulties and investment risks.

At present, with the blanking quality ensured, a laser uncoiling and blanking line has a regular production rate less than dozens of sheets per minute, and such a low output exactly meets the requirements of some new vehicle models, personalized vehicle models and modified models, without using huge die development expenses and long die trial period for the vehicle models. Moreover, such a production rate exactly matches that of a common stamping forming line. Thus, a method combining a laser blanking line and a stamping line becomes possible.

SUMMARY

An object of the present invention is to provide an uncoiling, blanking and forming method which can achieve joining-up in series of a blanking line and a stamping forming line and realize matching therebetween. This method can reduce intermediate steps such as stacking, packing, transportation, positioning, unpacking, carrying, and centring of sheets and stamping-formed workpieces, and also can reduce the room required for transfer, simplify the work flow and joins up procedures in series, to directly machine a material coil by laser blanking to form formed parts.

To achieve the above-mentioned object, a technical solution of the present invention is provided as follows.

An uncoiling, blanking and forming method includes the steps of:

1) uncoiling a steel coil, wherein a steel strip uncoiled from the steel coil is cleaned and straightened and is fed by a pinch roller to a blanking region;

2) laser blanking, wherein the steel coil enters the blanking region, is cut by a laser cutting head by way of laser blanking to form sheets with a required shape, with waste materials falling down and being conveyed to the outside;

3) outputting the sheets, wherein the sheets are received and conveyed by a magnetic telescopic belt conveyor, and then carried by means of a manipulator or a robot with an external shaft to a stamping process, and then the sheets are placed into a stamping lower die; or the sheets are picked up and conveyed directly by the robot with an external shaft to the stamping process, and then the sheets are placed into the stamping lower die;

4) stamping forming, wherein the sheets are stamped to form workpieces of a certain shape and size, and are edge-cut, punched and trimmed; and 5) checking the formed workpieces, wherein the formed workpieces are output, checked and finally put in storage.

Further, in step 1), a looper device is provided between the straightening process and the pinch roller.

In step 2), the sheets can move dynamically during cutting, or be cut in a static state.

In step 2), at least one laser light source is used with the laser cutting head to perform laser cutting and blanking.

In step 2), two laser cutting heads are used for static cutting of plates.

In step 2), the waste materials fall down and are conveyed to outside by using a waste material chute combined with a waste conveying chain to a waste material collection box.

In step 3), the sheets are pretreated before stamping, the pretreatment including coating the plates with oil.

In step 3), the sheets are centred first, and then picked up by the manipulator or robot and carried to the stamping lower die.

In step 4), the stamping forming is simply divided into manual production and automated production depending on the parts to be produced, wherein a robot or a manipulator is used for material loading and unloading in the automated production, and the manipulator includes a single-arm cross-bar manipulator or a double-arm cross-bar manipulator.

In step 5), the formed workpieces are output and checked by being picked up by a robot, and being subjected to a surface quality detection and a shape and position detection, wherein viewing and visual inspection are used to detect burrs and defects of parts, the detection tools include a vernier caliper, a micrometer and an inspection jig, and the shape and position detection is performed in an off-line or 3D on-line manner.

The advantages of the present invention are as follows.

The present invention is designed on the basis of the production yield match between the laser blanking and the stamping forming. This method can reduce intermediate steps such as stacking, packing, transportation, positioning, unpacking, carrying, and centring of planer sheets and stamping-formed workpieces, and also can reduce the room required for transfer, simplify the work flow and joins up procedures in series, to directly machine a material coil by laser blanking to form formed parts.

DETAILED DESCRIPTION

Figure 1:
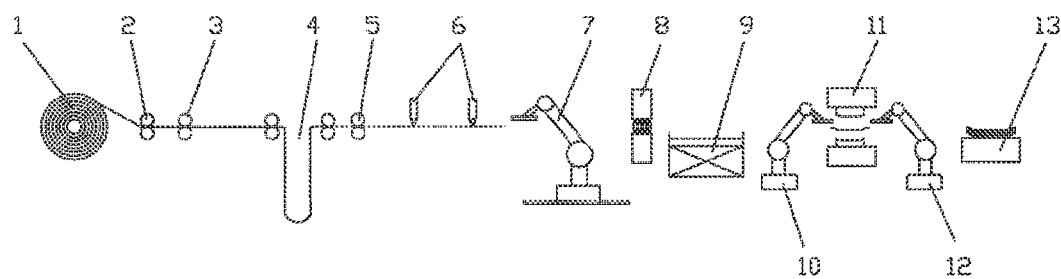
FIG. 1 is a schematic diagram of a first embodiment of the present invention.

With reference to FIG. 1, a schematic diagram of a first embodiment of the present invention is shown. An uncoiling, blanking and forming method of the present invention includes the steps of the followings.

1) uncoiling a steel coil, wherein a steel strip uncoiled from steel coil 1 is subjected to cleaning 2, straightening 3, and passes over a looper 4, and a pinch roller 5 into a blanking region;

2) laser blanking, wherein the steel coil enters the blanking region, is cut by a laser cutting head 6 by way of laser blanking to form sheets with a required shape, with waste materials falling down and being conveyed to the outside;

3) outputting the sheets, wherein the sheets are received and conveyed by a magnetic telescopic belt conveyor, and then carried by means of a manipulator or a robot with an external shaft to a stamping process, and then the sheets are placed into a stamping lower die;

4) stamping forming, wherein the sheets are stamped 11 to form workpieces of a certain shape and size, and are edge-cut, punched and trimmed; and 5) checking the formed workpieces, wherein the formed workpieces are output, checked and finally put in storage 13.

According to this embodiment, in step 2), two laser cutting heads are used for static cutting of plates.

In step 2), the waste materials fall down and are conveyed to outside by using a waste material chute combined with a waste conveying chain to a waste material collection box.

In step 3), the sheets are picked up and conveyed directly by the robot with an external shaft to the stamping lower die. The pretreatment before stamping includes cleaning the plates and coating the plates with oil. The sheets are centred by the manipulator or the robot which picks up the sheets during loading, and then carried by the manipulator or the robot to the stamping lower die.

In step 4), the stamping forming is simply divided into manual production and automated production depending on the parts to be produced, wherein a robot or a manipulator is used for material loading and unloading in the automated production, and the manipulator includes a single-arm cross-bar manipulator or a double-arm cross-bar manipulator.

In step 5), the formed workpieces are output and checked by being picked up by a robot, and being subjected to a surface quality detection and a shape and position detection, wherein viewing and visual inspection are used to detect burrs and defects of parts, the detection tools include a vernier caliper, a micrometer and an inspection jig, and the shape and position detection is performed in an off-line or 3D on-line manner.

Specifically, a whole-line cyclic operation mode according to a first embodiment of the present invention is as follows.

A material coil is uncoiled by an uncoiling machine 1 and fed into a plate strip cleaning machine 2, is subjected to straightening 3, passes over a looper 4 and then is pinched by a pinch device 5, and then enters a laser cutting head 6 for cutting and removing waste materials; the obtained sheets are transferred by a carrying robot 7 to a platform for sheet cleaning 8 and oil coating 9; and a picking up robot 10 picks up the sheets and places them into a stamping machine 11, and an unloading robot 12 picks up the stamped sheets and puts them in storage 13.

Figure 3:
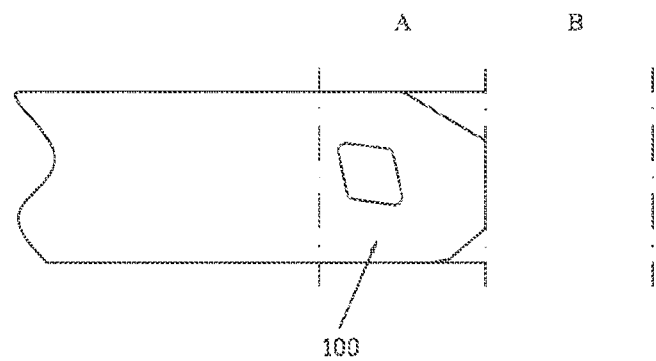
FIGS. 3 and 4 are schematic diagrams of an uncoiling and blanking forming process of a first embodiment of the present invention.
Figure 4:
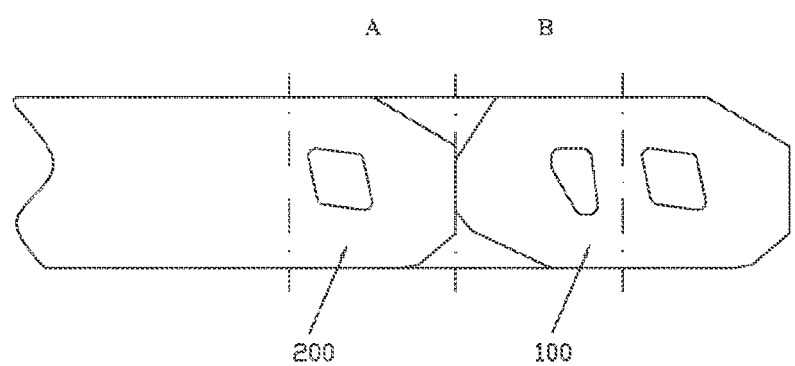

As shown in FIGS. 3 and 4, in this embodiment, two laser cutting heads are used for cutting. The plate strip enters a static blanking region after being subjected to the uncoiling and preparation processes, a first laser cutting head partially cuts a sheet 100 in a first cutting region A, the plate strip advances a step corresponding to one sheet, a second laser cutting head further cuts the rest of the sheet 100 in a second cutting region B to obtain output sheets, and at the same time the first laser cutting head partially cuts a sheet 200 in the first cutting region A; such a process is repeated.

After the two laser cutting heads complete the cutting operations in this region, the plate strip advances a step, and cutting is continued. The sheets after the cutting are carried by a carrying robot with an external shaft to a stamping preparation process for cleaning and oil coating, and then a press performs stamping, and acceptable products after a check are put in storage.

In addition, the first laser cutting head can also partially cut more than two sheets, and the second laser cutting head cuts the rest of the sheets to obtain output sheets.

Figure 2:
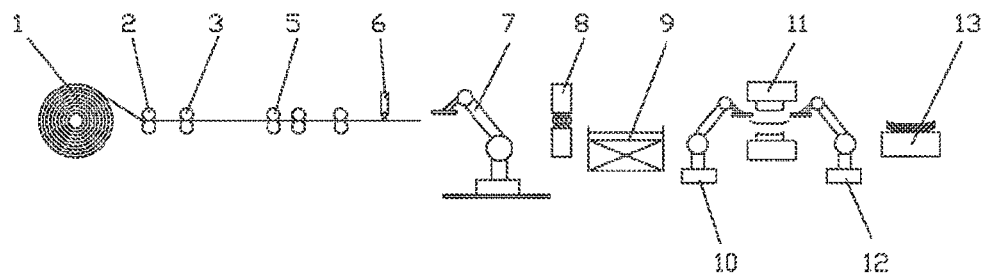
FIG. 2 is a schematic diagram of a second embodiment of the present invention.

FIG. 2 is a schematic diagram of a system solution of a second embodiment according to the present invention. In order to achieve a production rate matching between production lines, the system solution as shown in FIG. 2 can be used for blanking forming of different sheets, and a single cutting head is used in a cutting and blanking region. For example, for a planar sheet of a small cutting size or a simple cut shape (a rectangular or trapezoidal shape), a single-laser dynamic continuous cutting method can be used without using a looper.

What is claimed is:

1. An uncoiling, blanking and forming method, comprising the steps of:
   1) uncoiling a steel coil, wherein a steel strip uncoiled from the steel coil is cleaned and straightened and is fed by a pinch roller to a blanking region;
   2) laser blanking the steel strip, wherein the steel coil enters the blanking region, is cut by a laser cutting head by laser blanking to form sheets with a required shape, with waste materials falling down and being conveyed to the outside;
   3) outputting the sheets, wherein the sheets are received and conveyed by a magnetic telescopic belt conveyor, and then carried by means of a manipulator or a robot with an external shaft to a stamping process, and then the sheets are placed into a stamping lower die; or the sheets are picked up and conveyed directly by the robot with an external shaft to the stamping process, and then the sheets are placed into the stamping lower die;
   4) stamping forming the sheets, wherein the sheets are stamped to form workpieces of a certain shape and size, and are edge-cut, punched and trimmed; and
   5) checking the formed workpieces, wherein the formed workpieces are output, checked and finally put in storage.

2. The uncoiling, blanking and forming method of claim 1, wherein in step 1), a looper device is provided between the straightening process and the pinch roller.

3. The uncoiling, blanking and forming method of claim 1, wherein in step 2), the sheets move dynamically during cutting, or be cut in a static state.

4. The uncoiling, blanking and forming method of claim 1, characterized in that in step 2), at least one laser light source is used with the laser cutting head to perform laser cutting and blanking.

5. The uncoiling, blanking and forming method of claim 1, wherein in step 2), two laser cutting heads are used for static cutting of plates.

6. The uncoiling, blanking and forming method of claim 1, wherein in step 2), the waste materials fall down and are conveyed to outside by using a waste material chute combined with a waste conveying chain to a waste material collection box.

7. The uncoiling, blanking and forming method of claim 1, wherein in step 3), the sheets are pretreated before stamping, the pretreatment including coating the plates with oil.

8. The uncoiling, blanking and forming method of claim 1, wherein in step 3), the sheets are centered first, and then picked up by the manipulator or robot and carried to the stamping lower die.

9. The uncoiling, blanking and forming method of claim 1, wherein in step 4), the stamping forming is simply divided into manual production and automated production depending on the parts to be produced, wherein a robot or a manipulator is used for material loading and unloading in the automated production.

10. The uncoiling, blanking and forming method of claim 9, wherein said manipulator includes a single-arm cross-bar manipulator or a double-arm cross-bar manipulator.

11. The uncoiling, blanking and forming method of claim 1, wherein in step 5), the formed workpieces are output and checked by being picked up by a robot, and being subjected to a surface quality detection and a shape and position detection, wherein viewing and visual inspection are used to detect burrs and defects of parts, the detection tools include a vernier caliper, a micrometer and an inspection jig, and the shape and position detection is performed in an off-line or 3D on-line manner.

* * * * *